United States Patent [19]
Fukuyama et al.

[11] Patent Number: 5,477,410
[45] Date of Patent: Dec. 19, 1995

[54] RECORDING OR REPRODUCING APPARATUS USING A STABILIZING PAD

[75] Inventors: Shigeru Fukuyama, Yokohama; Yoshitaka Watanabe, Kawasaki; Atsushi Nanba, Yokohama; Tsukasa Uehara, Kawasaki, all of Japan

[73] Assignee: Canon Kabushiki Kaisha, Tokyo, Japan

[21] Appl. No.: 264,236

[22] Filed: Jun. 22, 1994

Related U.S. Application Data

[63] Continuation of Ser. No. 978,453, Nov. 19, 1992, abandoned, which is a continuation of Ser. No. 609,410, Nov. 5, 1990, abandoned.

[30] Foreign Application Priority Data

| Nov. 7, 1989 | [JP] | Japan | 1-290908 |
| Nov. 7, 1989 | [JP] | Japan | 1-290909 |
| Nov. 7, 1989 | [JP] | Japan | 1-290910 |
| Nov. 7, 1989 | [JP] | Japan | 1-290911 |

[51] Int. Cl.$^6$ .......................... G11B 21/20; G11B 5/012
[52] U.S. Cl. ...................... 360/104; 360/130.34
[58] Field of Search .............................. 360/128, 130.34, 360/102, 104, 107, 109, 128, 130.34

[56] References Cited

U.S. PATENT DOCUMENTS

| 4,600,955 | 7/1986 | Regruit | 360/130.34 |
| 4,630,150 | 12/1986 | Collins et al. | 360/99.12 |
| 4,809,106 | 2/1989 | Inoue | 360/109 |
| 4,833,556 | 5/1989 | Kosarko et al. | 360/130.34 |
| 4,998,175 | 3/1991 | Yoshimori et al. | 360/130.34 |
| 5,005,098 | 4/1991 | Kanada | 360/130.34 |
| 5,036,415 | 7/1991 | Nagamori et al. | 360/130.34 |
| 5,047,888 | 9/1991 | Mitsuhashi et al. | 360/130.34 |
| 5,079,661 | 1/1992 | Iwanaga | 360/109 |
| 5,191,497 | 3/1993 | Saito | 360/130.34 |

FOREIGN PATENT DOCUMENTS

| 0333431 | 9/1989 | European Pat. Off. . | |
| 0240860 | 9/1990 | Japan | 360/128 |

OTHER PUBLICATIONS

Weidenhammer, "Transducer Head for Multiple Flexible Disk Pack," IBM Technical Disclosure Bulletin, vol. 20, No. 3, Aug. 1977, pp. 1132 and 1133.

McWhinney, "Trirail Slider with Low–Profile Center Rail," IBM Technical Disclosure Bulletin, vol. 20, No. 3, Aug. 1977, p. 1202.

Patent Abstracts of Japan, Kokai No. 60-150264, vol. 9, No. 327, Dec. 1985.

Patent Abstracts of Japan, Kokai No. 60-246010, vol. 10, No. 116, Apr. 1986.

*Primary Examiner*—Stuart S. Levy
*Assistant Examiner*—Jefferson Evans
*Attorney, Agent, or Firm*—Fitzpatrick, Cella, Harper & Scinto

[57] ABSTRACT

A recording or reproducing apparatus for recording or reproducing information by relatively moving a head and a sheet recording medium is disclosed. The recording or reproducing apparatus includes a stabilizing member disposed around the head and arranged to generate pressure which brings the recording medium into contact with the head in accordance with the rotation of the recording medium. The stabilizing member includes a first projection portion having a projection surface projecting toward the recording medium, a second projection portion disposed outside of the first projection portion via a groove portion formed outside the first projection portion, the second projection portion having a projection surface projecting toward the recording medium, and a cut portion formed in a portion of the second projection portion downstream from the head in a direction of rotation of the recording medium, the cut portion being formed by cutting the second projection portion from its surface which confronts the recording medium, and the depth of the groove portion with respect to the recording medium being reduced from the outer portion of the stabilizing member to the inner portion of the same.

4 Claims, 12 Drawing Sheets

RECORDING OR REPRODUCING APPARATUS USING A STABILIZING PAD

This application is a continuation of prior application, Ser. No. 07/978,453 filed Nov. 19, 1992, which application is a continuation of prior application, Ser. No. 07/609,410 filed Nov. 5, 1990, both now abandoned.

BACKGROUND OF THE INVENTION

1. Field of the Invention

The present invention relates to a recording or reproducing apparatus, and, more particularly, to a stabilizing member (pad) serving as an interface to stabilize a condition of contact between a recording or reproducing head and a recording medium.

2. Description of the Prior Art

Hitherto, a recording or reproducing apparatus capable of recording information on or reproducing information from a sheet recording medium such as a flexible magnetic disk has been known.

In an apparatus of the type described above, the running magnetic sheet has been able to stably come in contact with the magnetic head by hydrodynamical pressure generated by a stabilizing plate (pad) which generates the pressure in association with the rotational action of the magnetic sheet.

A pad of the type described above has been disclosed as shown in FIG. 1. That is, a pad 101 is fastened to surround a magnetic head 100, the pad 101 having a space (recessed groove) 101a capable of generating hydrodynamical negative pressure on a surface thereof which confronts the magnetic sheet, the hydrodynamical negative pressure attracting the magnetic sheet to the magnetic head 100 due to the rotation of the magnetic sheet. Furthermore, the pad 101 further comprises a projection portion 101b on the periphery thereof, the projection portion 101b forming the above-described space (recessed groove). In addition, a cut portion 101d is formed at a position on the edge of the pad 101 downstream in the direction of rotation of the magnetic sheet, the cut portion 101d enabling air to flow out.

Figure 1A:
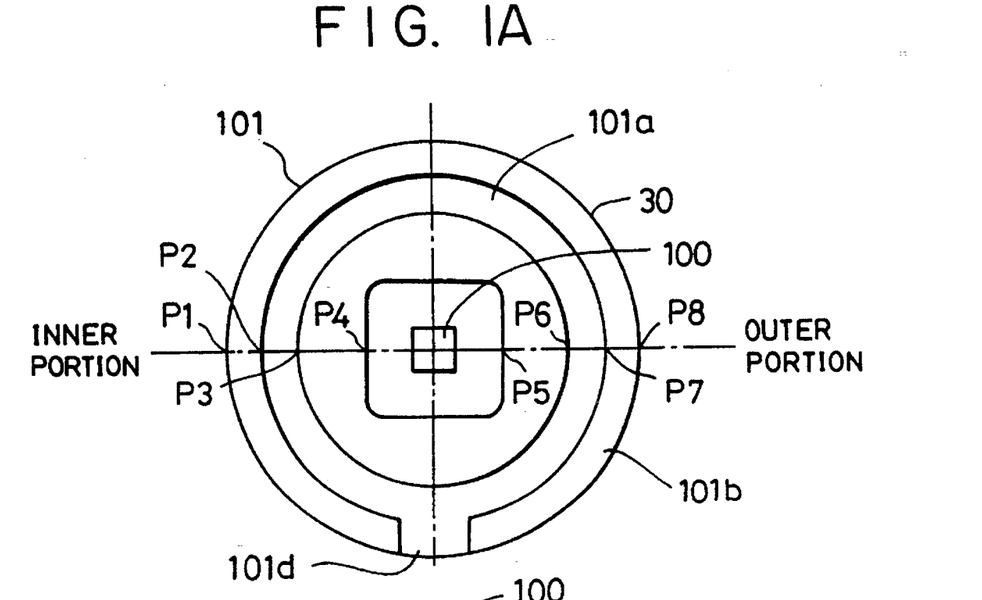
FIG. 1 illustrates the shape of a conventional negative pressure pad.
Figure 1B:
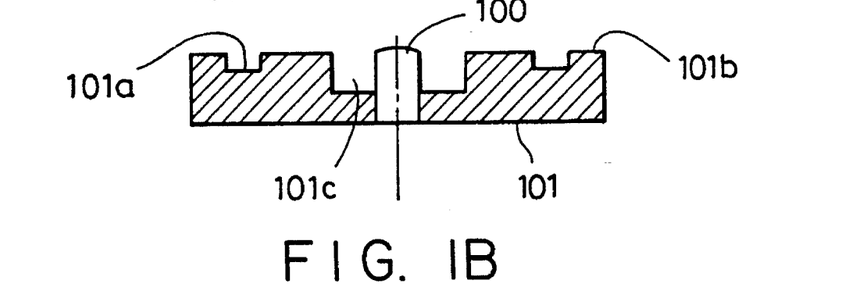

The magnetic head 100 is disposed so as to project upwards through a central opening 101c formed in the pad 101.

A negative pressure pad of the type described above is arranged to act in such a manner that, when the magnetic sheet is rotated, air in the above-described space and confronting the magnetic sheet flows out through a gap formed between the projection portion and the magnetic sheet and through the cut portion formed in the surface of the projection portion. In addition, since substantially no air flows into the gap between the projection portion and the magnetic sheet, negative pressure is generated in the above-described space and the gap between the projection portion and the magnetic sheet. As a result, the magnetic sheet is attracted by the negative pressure thus generated so as to closely contact the magnetic head.

Figure 5:
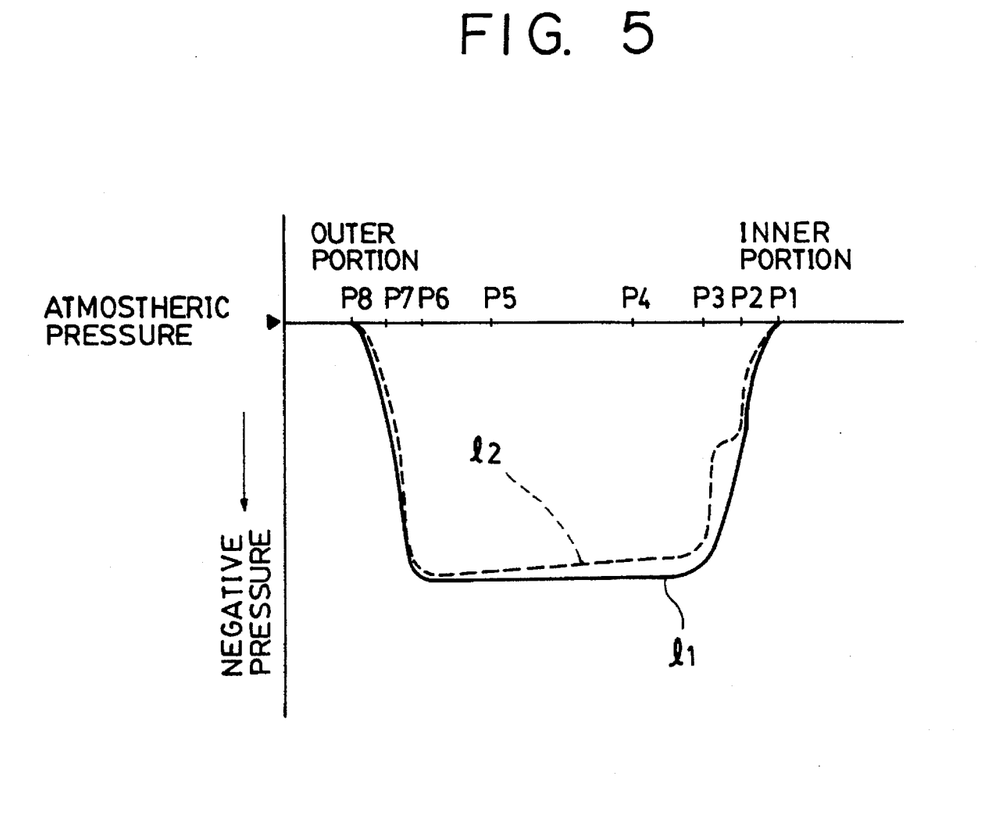
FIG. 5 illustrates the pressure acting between the negative pressure pad and the magnetic sheet.

The above-described conventional negative pressure pad usually has been arranged in such a manner that the depth of the groove portion 101a is uniform. The results of the hydrodynamical analysis of the distribution of the negative pressure generated between the negative pressure pad and the magnetic sheet are designated by curve $l_2$ shown in FIG. 5. Referring to FIG. 5, positions denoted by symbols P1 to P8 correspond to the positions P1 to P8 of the surface of the pad 101 shown in FIG. 1 which confront the magnetic sheet. As is shown, the level of the negative pressure at the inner portion is lower than that at the outer portion.

As described above, the conventional negative pressure pad has a problem in that the levels of the negative pressure generated in the inner portion of the disk (magnetic sheet) and the outer portion of the same become considerably different from each other due to the difference in the peripheral velocity between the two portions. That is, since the inner portion of the disk rotates more slowly than the outer portion, the force for attracting the disk becomes weak in the inner portion. This condition is amplified, since the inner portion is more rigid than the outer portion of the disc, because of the disk having a center core in the center portion thereof. Therefore, the inner portion of the disk cannot be easily deformed in comparison to the outer portion of the same. As a result, in a case when, for example, a frame recording head is utilized in which an excellent head touch is desired over a wide area, a problem arises in that the desired head touch cannot be obtained due to the insufficient level of the negative pressure in the inner portion. If negative pressure of an excessive level is applied, a problem arises in that the spindle motor suffers from an excessively large load. What is even worse is that the disk will vibrate due to the attractive force and the restoring force of the disk, causing jitter to be generated. Furthermore, if the rotational speed of the spindle motor is changed, recording or reproducing cannot be correctly performed.

SUMMARY OF THE INVENTION

Accordingly, an object of the present invention is to stabilize the relative movement between a head and a sheet recording medium.

A second object of the present invention is to provide a recording or reproducing apparatus capable of equalizing the negative pressure between the inner portion of the stabilizing member and the outer portion of the same and to prevent deterioration in the head touch due to the unbalance of the negative pressure, whereby stable and excellent head touch can be obtained.

A third object of the present invention is to provide a recording or reproducing apparatus capable of overcoming the unbalance between the negative pressure at the inner portion of the magnetic sheet and the outer portion of the same by an extremely simple method arranged in such a manner that the depth of the groove formed in a negative pressure pad is reduced in the portion corresponding to the inner portion of the magnetic sheet. Therefore, excellent head touch can be obtained regardless of the position of the head so that the image quality can be improved in a recording or reproducing operation. Furthermore, the vibrations of the disk can be prevented and jitter can thereby be prevented since the magnetic sheet can be stably attracted to the pad.

In order to achieve the above-described objects, an aspect of the present invention lies in a recording or reproducing apparatus for recording or reproducing information by relatively moving a head and a sheet recording medium, the recording or reproducing apparatus comprising: a stabilizing member disposed around the head and arranged to generate pressure which brings the recording medium into contact with the head in accordance with the rotation of the recording medium, wherein the stabilizing member includes a first projection portion having a projection surface projecting toward the recording medium, a second projection portion disposed outside of the first projection portion via a groove portion formed outside the first projection portion, the second projection portion having a projection surface projecting toward the recording medium, and a cut portion formed in a portion of the second projection portion downstream from the head in a direction of rotation of the recording medium, the cut portion being formed by cutting the second projection portion from a surface thereof which confronts the recording medium, and the depth of the groove portion with respect to the recording medium being reduced from the outer portion of the stabilizing member to the inner portion of the same.

A fourth object of the present invention is to provide a recording or reproducing apparatus in which the magnetic sheet can be stably brought into contact with the magnetic head since the magnetic sheet is attracted to the head when the magnetic sheet is being rotated, while, after the rotation of the magnetic sheet has been stopped, the magnetic sheet can quickly be separated from the magnetic head so that sticking of the magnetic sheet to the head can be prevented.

In order to achieve the fourth object, an aspect of the present invention lies in a recording or reproducing apparatus for recording or reproducing information by relatively moving a head and a sheet recording medium, the recording or reproducing apparatus comprising: a stabilizing member arranged to generate pressure which brings the recording medium into contact with the head by a relative movement of the recording medium and the head, wherein the stabilizing member includes a first projection portion having a projection surface projecting toward the recording medium, and a second projection portion disposed outside of the first projection portion via a groove portion formed outside the first projection portion, the second projection portion having a projection surface projecting toward the recording medium, and a cut portion formed in a portion of the first projection portion upstream in a direction of rotation of the recording medium, the cut portion being formed by cutting the first projection portion from a surface thereof which confronts the recording medium.

Other and further objects, features and advantages of the invention will be more fully apparent from the following description.

DESCRIPTION OF THE PREFERRED EMBODIMENTS

Preferred embodiments of a recording or reproducing apparatus according to the present invention will now be described with reference to the drawings.

Figure 2:
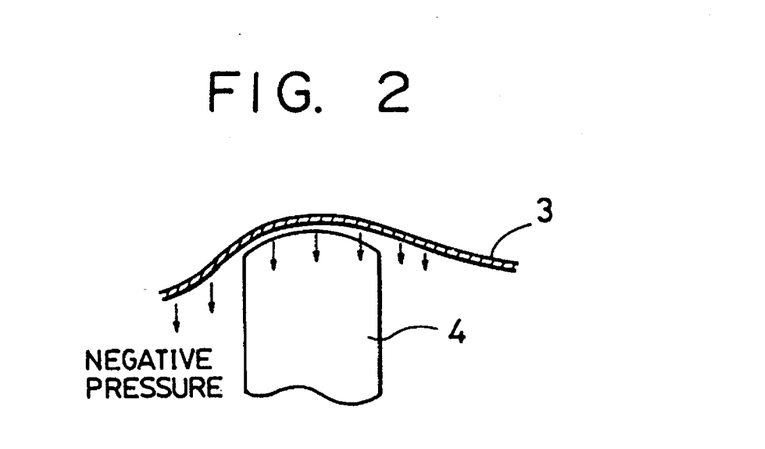
FIG. 2 illustrates the deformation of a magnetic sheet on a magnetic head.
Figure 3:
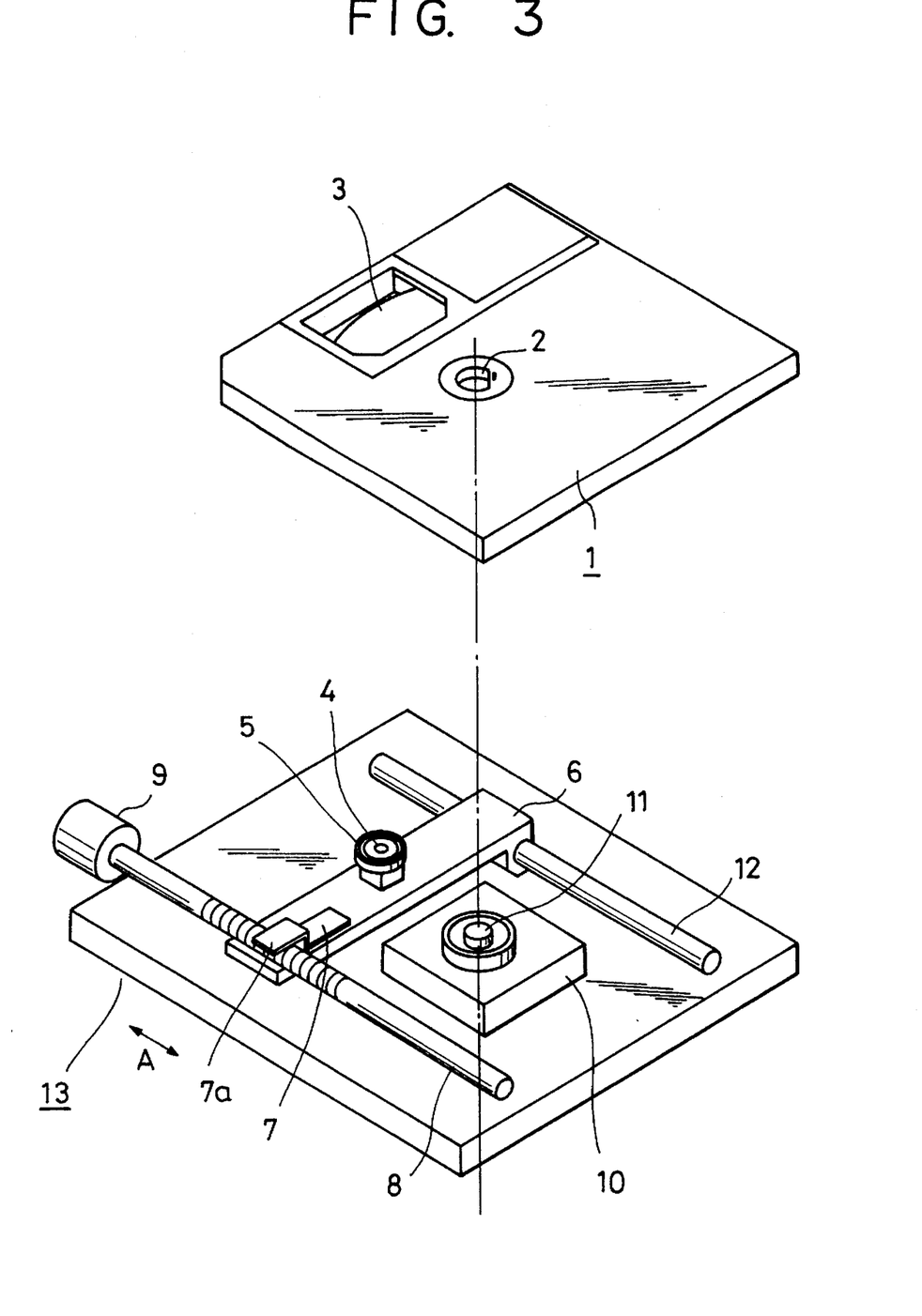
FIG. 3 is a perspective view which illustrates a disk drive according to the present invention.

FIG. 3 is a perspective view which illustrates an embodiment of a recording or reproducing apparatus according to the present invention. Referring to the drawing, reference numeral 1 represents a disk jacket which rotatably accommodates a recording magnetic sheet 3. The magnetic sheet 3 has, at the central portion thereof, a center core 2 which can be reliably aligned and held by a spindle fastened to the rotational shaft of a spindle motor 10 to be described later. Reference numeral 13 represents a disk drive device for rotating a disk accommodated in the disk jacket 1. Reference numeral 4 represents a recording or reproducing magnetic head and reference numeral 5 represents a negative pressure generating pad disposed around the magnetic head 4 and arranged to generate an attractive force (negative pressure) due to the rotation of the disk, the details of the negative pressure being described later. The head 4 and the negative pressure pad 5 are respectively bonded to a head carriage 6 which acts to move the head 4. The head carriage 6 is engaged with a head feeding mechanism, that is, a step motor 9 and a lead screw 8 via a recessed portion 7a of an elastic member 7 made of, for example, a leaf spring. Another end of the head carriage 6 is held by a guide rod 12 in such a manner that it can slide in the axial direction of the guide rod 12 so that the head carriage 6 is moved a predetermined distance in the radial direction of the magnetic sheet 3, in the direction designated by double-head arrow A, by the rotation of the motor 9. Reference numeral 10 represents a spindle motor for rotating the magnetic sheet 3, the spindle motor 10 having a chucking portion 11 which holds the center core 2 of the disk. The chucking portion 11 and the magnetic sheet are arranged to be detached/attached from each other by a known means when the disk jacket is attached/detached. When the spindle motor 10 is rotated, the magnetic sheet 3 is rotated, causing the sheet 3 to be attracted to the pad due to the hydrodynamical action acting between the sheet 3 and the negative pressure pad 5. As a result, the sheet 3 can satisfactorily be brought into contact with the magnetic head 4, as shown in FIG. 2, so that an excellent head touch can be realized.

Figure 4A:
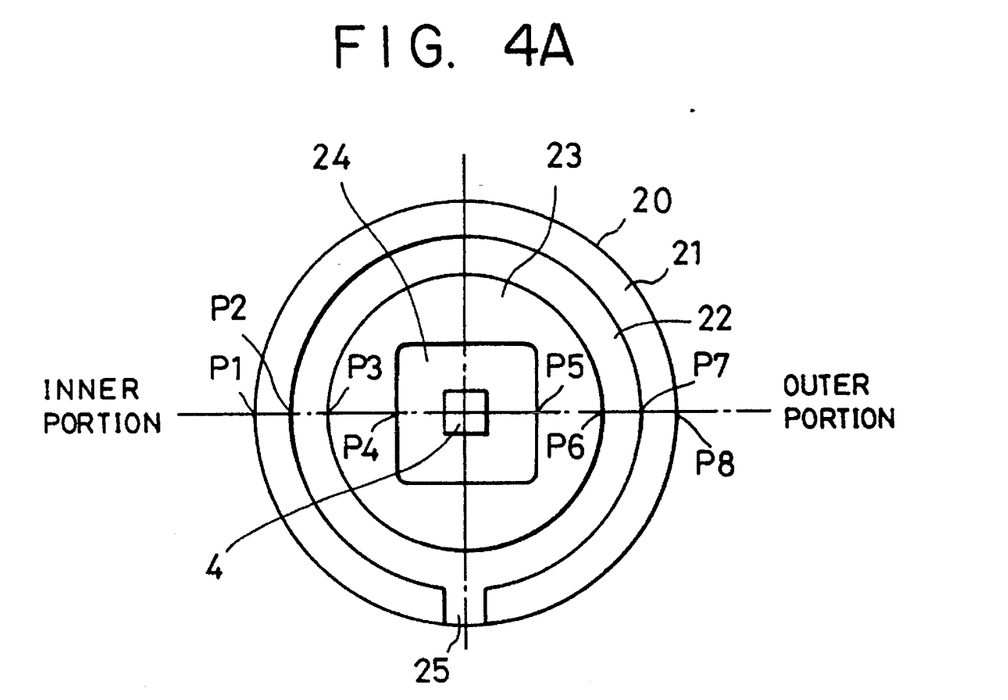
FIG. 4 illustrates the shape of a negative pressure pad according to the present invention.
Figure 4B:
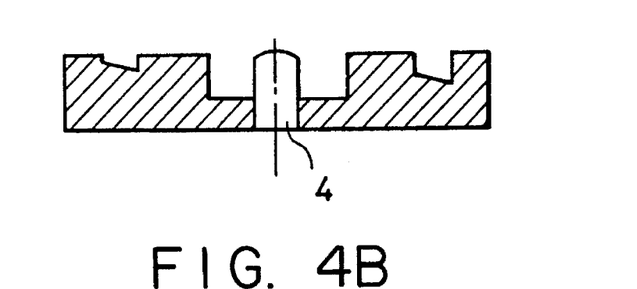

FIG. 4 is an enlarged view of a negative pressure pad according to the present invention. A negative pressure pad 20 comprises a first block portion 23 disposed around the magnetic head 4 and arranged to have a projection portion having a surface projecting toward the magnetic sheet. The negative pressure pad 20 further comprises a second block portion 21 disposed to surround the first block portion 23 and arranged to have a projection portion having a surface projecting toward the magnetic sheet. Furthermore, the negative pressure pad 20 comprises a recessed groove 22 formed in such a manner that it divides the first block portion 23 and the second block portion 21 from each other. In addition, the negative pressure pad 20 has a cut portion 25 formed by cutting the projection portion of the second block 21 downstream in the direction of the rotation of the magnetic sheet, the cut portion 25 acting to cause the air to flow out. The bottom surface of the recessed groove 22 is slanted from the inside to the outside of the magnetic sheet in such a manner that the depth of the recessed groove 23 is reduced in the inner portion in comparison to the depth of the outer portion. The first block portion 23 has an opening 24 at the central portion thereof so as to fasten the magnetic head.

When the magnetic sheet is rotated with the negative pressure pad 20 disposed around the head, an air flow is generated between the negative pressure pad and the magnetic sheet due to the rotation of the magnetic sheet so that a negative pressure which attracts the magnetic sheet to the head is generated. The results of the hydrodynamical analysis of the distribution of the negative pressure generated between the negative pressure pad and the magnetic sheet are designated by curve $1_1$ shown in FIG. 5. As shown in FIG. 5, the unbalance of the distribution of the negative pressure between the inner portion of the magnetic sheet and that at the outer portion of the same can be overcome in comparison to the pressure distribution $1_2$ obtainable from the structure in which the depth of the recessed groove 22 is arranged to be equal in the inner and outer portions. Positions P1 to P8 in FIG. 5 correspond to the positions P1 to P8 shown in FIG. 4. Therefore, the inner portion of the sheet and the outer portion of the same cause a uniform attractive force. As a result, excellent head touch can be realized between the magnetic sheet and the magnetic head regardless of the position of the magnetic head. Furthermore, undesirable vibrations of the magnetic sheet due to the unbalance of the attractive force can be prevented.

Figure 6:
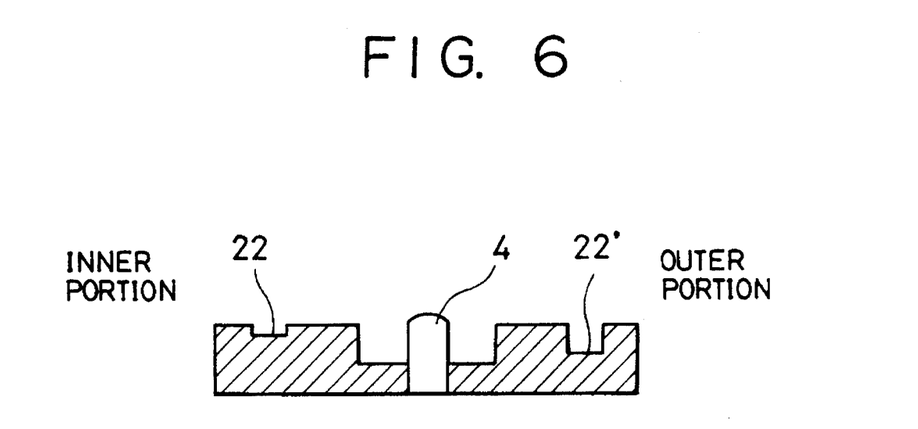
FIG. 6 illustrates another embodiment of the negative pressure pad according to the present invention.

Although the bottom surface of the groove portion is slanted according to this embodiment in terms of easily manufacturing the structure, other structures can, of course, be employed in which the bottom surface of the recessed groove 22' is, as shown in FIG. 6, arranged to be substantially parallel to the magnetic sheet. If the depth of the same at the inner portion and that at the outer portion are different from each other with respect to the magnetic sheet, a similar effect can be obtained.

As described above, according to the recording or reproducing apparatus of the present invention, the undesired unbalance in the pressure distribution taking place between the inner portion of the magnetic sheet and the outer portion of the same can be overcome by an extremely simple structure in which the depth of the groove formed in the negative pressure pad is arranged to be different between the inner portion and the outer portion. Therefore, a desired head touch can be obtained regardless of the position of the head, causing the image quality to be improved. Furthermore, since the magnetic sheet can stably be attracted to the pad, vibrations of the disk can be prevented, also preventing jitter.

A third embodiment of the present invention now will be described. According to this embodiment, the stabilizing member for stabilizing the condition of contact between the head and the recording medium can be improved.

Figure 7A:
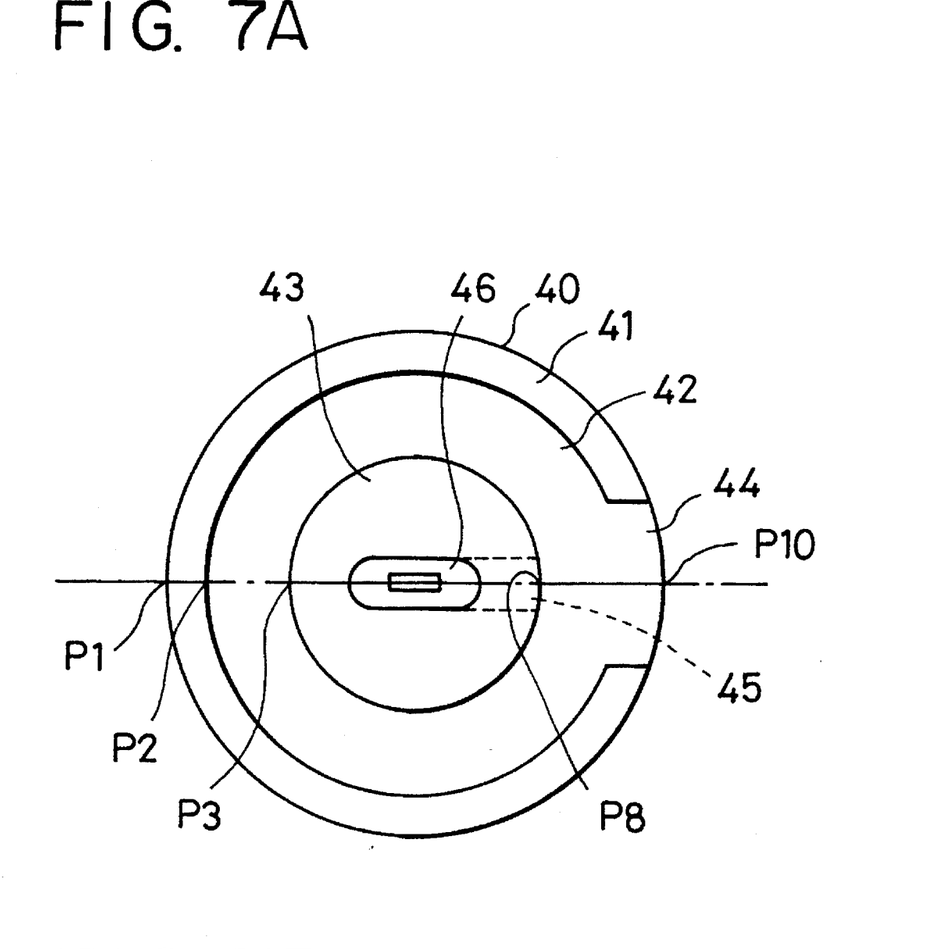
FIGS. 7A and 7B are a plan view and a side elevational view which respectively illustrate an example of a conventional negative pressure pad.
Figure 7B:
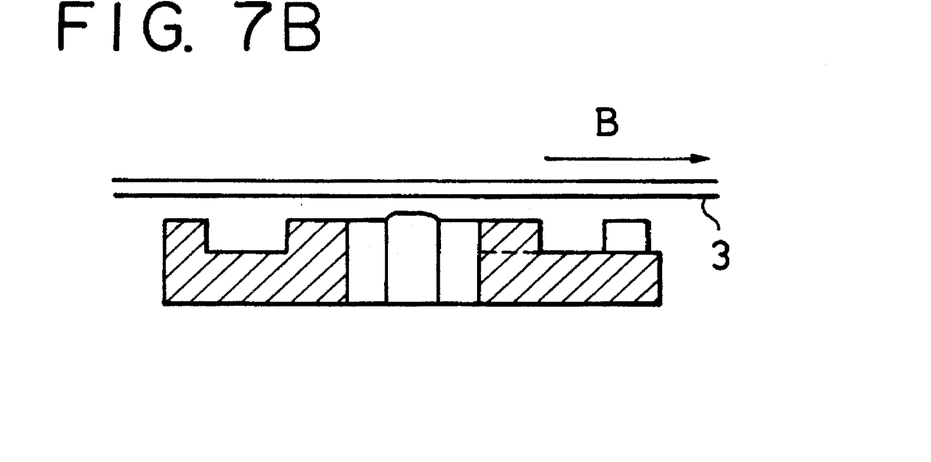

FIGS. 7A and 7B are a plan view and a side elevational view which respectively illustrate an example of a conventional negative pressure pad, where arrow B designates a direction of rotation of the magnetic sheet 3.

Referring to these drawings, reference numeral 40 represents a negative pressure pad having a projection 43 which has an elongated opening 46 formed at the central portion thereof. The magnetic head 4 projects in the direction toward the upper surface of the negative pressure pad 40. Furthermore, a recessed groove 42 is concentrically formed around the projection 43. In addition, a projection 41 having a surface which is positioned to closely contact the magnetic sheet is disposed around the recessed groove 42. Furthermore, a cut portion 44 is formed in the rear edge of the projection 41 downstream in the direction of the rotation of the magnetic sheet, the cut portion 44 being formed by downwards cutting the pad from its upper surface. The cut portion 44 acts to control the negative pressure on the upper surface of the negative pressure pad by allowing air to flow out in the recessed groove 44 during the rotation of the magnetic sheet.

Figure 8:
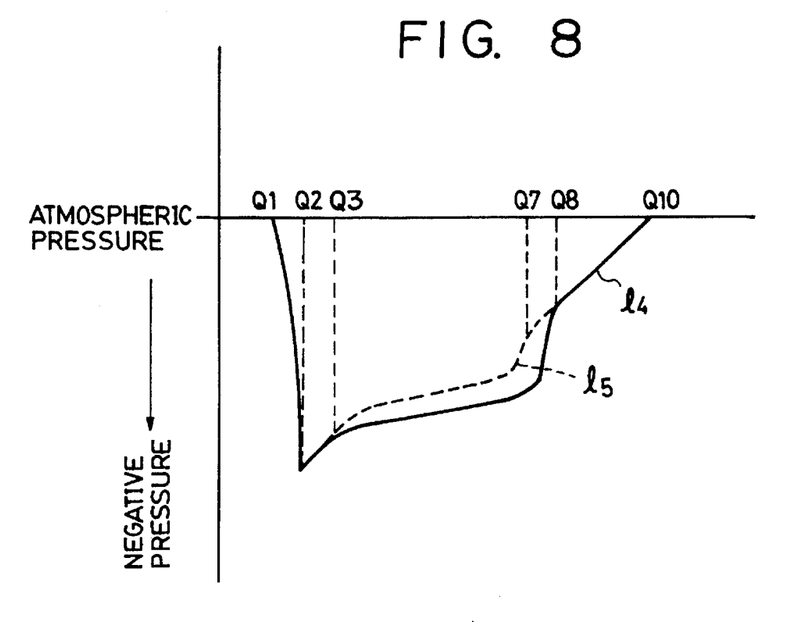
FIG. 8 illustrates the pressure distribution characteristics of the negative pressure pad shown in FIGS. 7A and 7B.

A negative pressure pad of the type described above is arranged to act in such a manner that, when the magnetic sheet is rotated, air in the space in the above-described recessed groove 42 confronting the magnetic sheet flows out through a gap formed between the projection 41 and the magnetic sheet and through the cut portion 44 formed in the surface of the projection portion. In addition, since substantially no air flows into the above-described space and the gap formed between the projection 41 and the magnetic sheet, negative pressure is generated in the above-described space and the gap between the projection portion and the magnetic sheet. As a result, the magnetic sheet is attracted by the negative pressure thus generated so as to closely contact the magnetic head. The result of the hydrodynamical analysis of the distribution of the negative pressure given to the magnetic sheet when the magnetic sheet is rotated are designated by curve $1_4$ shown in FIG. 8. Referring to FIG. 8, the axis of the abscissa represents positions Q1 to Q10 on the center line of the negative pressure pad, while the axis of the ordinate represents the level of the pressure (negative pressure) given to the magnetic sheet from the negative pressure pad.

That is, as shown by the characteristics curve $1_4$, the pressure is rapidly lowered at the portion between positions Q1 and Q2, which corresponds to the projection 41, causing the negative pressure level to be raised. The pressure gradient becomes moderate in the portion between Q2 and Q3 which corresponds to the recessed groove. The pressure gradient then approaches a substantially constant negative pressure level, and then returns to the atmospheric pressure level.

However, the negative pressure pad shown in FIGS. 7A and 7B has a problem in that, if the rotation of the magnetic sheet is stopped, the magnetic sheet cannot be easily separated from the negative pressure pad.

In order to overcome the above-described problem, it is feasible to employ a structure arranged in such a manner that a cut portion 45 is formed in the projection 43 downstream in the direction of the rotation of the magnetic sheet. As a result, when the rotation of the magnetic sheet is stopped, the pressure level around the head immediately becomes atmospheric pressure by the action of the cut portion so that the magnetic sheet can quickly be separated from the negative pressure pad.

The negative pressure distribution of the negative pressure pad in the case when the cut portion 45 is formed in the downstream direction becomes such as designated by curve $1_5$ shown in FIG. 8.

As shown by the characteristics curve $1_5$, the pressure is also rapidly lowered in the portion between positions Q1 and Q2, causing the negative pressure level to be raised. The pressure gradient becomes moderate in the portion between positions Q2 and Q3 which corresponds to the recessed groove in which the depth of the groove is enlarged. Then, the negative pressure becomes substantially constant in the portion between Q3 and Q7 before it returns to the atmospheric pressure in the portion between Q7 and Q10. However, an influence of the cut portion 44 formed downstream of the projection 43 causes air to easily flow out. As a result, in particular, the negative pressure gradient toward the atmospheric pressure becomes larger in the downstream direction of the negative pressure pad. Therefore, the negative pressure in the vicinity of the magnetic head, that is, the attractive force, is lowered. As a result, the head touch becomes unstable and the stated object cannot be achieved.

Therefore, this embodiment is arranged for the purpose of overcoming the above-described problem by the arrangement of a recording or reproducing apparatus for recording or reproducing information by relatively moving a head and a sheet recording medium, the recording or reproducing apparatus comprising: a stabilizing member arranged to generate pressure which brings the recording medium into contact with the head by a relative movement of the recording medium and the head, wherein the stabilizing member includes a first projection portion having a projection surface projecting toward the recording medium, a second projection portion disposed outside of the first projection portion via a groove portion formed outside the first projection portion, the second projection portion having a projection surface projecting toward the recording medium, and a cut portion formed in a portion of the first projection portion upstream in a direction of rotation of the recording medium, the cut portion being formed by cutting the first projection portion from a surface thereof which confronts the recording medium.

As a result, there is provided a recording or reproducing apparatus in which sticking of the magnetic sheet to the negative pressure pad taking place after the rotation of the magnetic sheet has been stopped can be prevented while maintaining the negative pressure level around the magnetic head.

This embodiment now will be described with reference to FIGS. 9A, 9B and 10.

Figure 9A:
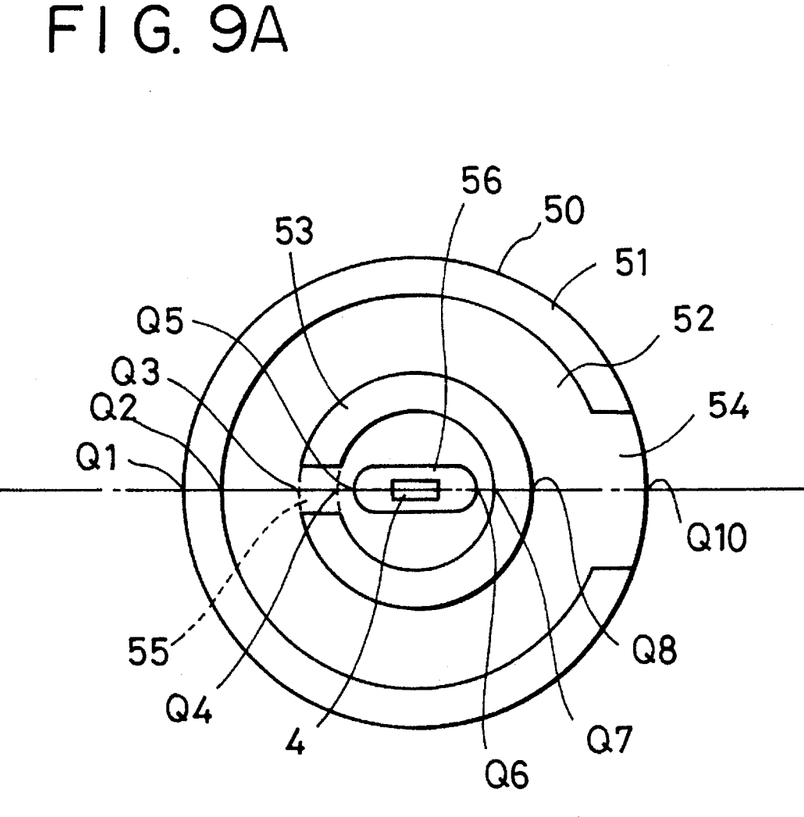
FIGS. 9A and 9B are a plan view and a side elevational view which respectively illustrate a third embodiment of a negative pressure pad employed in a recording or reproducing apparatus according to the present invention.
Figure 9B:
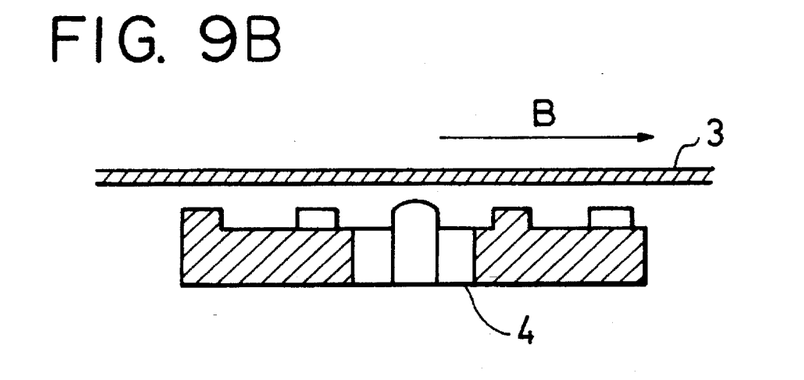

FIGS. 9A and 9B are, respectively, a plan view, which illustrates an example of a pad according to this embodiment, and a side elevational view taken along the central line thereof, for use in a disk drive device shown in FIG. 3. The negative pad 50 is disposed around the magnetic head 4 and arranged to have its upper surface confronting the magnetic sheet. A flat portion, having an elongated hole 56 through which the magnetic head passes at the central portion thereof, is formed in the upper surface of the negative pad 50. The negative pressure pad 50 has concentric projections 51 and 53 via recessed groove 52 in the peripheral portion thereof, the projections 51 and 53 being disposed at a predetermined interval so as to project over the flat portion by a predetermined height. In addition, a cut portion 54 is formed in the above-described projection downstream in the direction of the rotation of the magnetic sheet, the cut portion 54 acting to control the negative pressure level due to the negative pressure pad by discharging the air flow generated by the rotation of the magnetic sheet.

Another cut portion 55 is formed at the front edge of the outer projection 51 upstream in the direction of rotation of the magnetic sheet, the cut portion 55 being formed by cutting the projection 51 from an upper surface thereof which confronts the magnetic sheet.

The operational characteristics of the thus structured negative pressure pad according to the present invention now will be described. Assuming that the magnetic sheet is rotated in a direction designated by arrow B, air in the recessed grooves 52 and 53 confronting the magnetic sheet flows out through a gap between the projections 53 and 51 and the magnetic sheet and the cut portion 54 formed in the projection due to the viscosity of air. Furthermore, since substantially no air flows into the above-described space or through the gap between the projection and the magnetic sheet, negative pressure is generated in the above-described space and the gap between the projection and the magnetic sheet. As a result, the magnetic sheet is attracted by the thus generated negative pressure so that it closely contacts the magnetic head. Therefore, excellent head touch can be realized during the rotation of the magnetic sheet.

Figure 10:
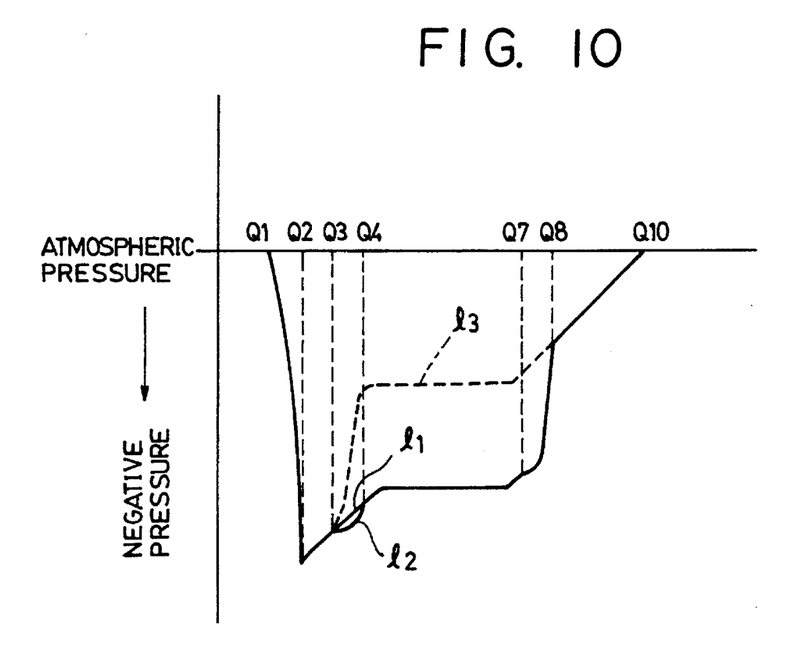
FIG. 10 illustrates the pressure distribution characteristics of the negative pressure pad according to the present invention.

FIG. 10 illustrates the results of the hydrodynamical analysis of the pressure (negative pressure) distribution on the magnetic sheet.

Referring to FIG. 10, the axis of the abscissa, similarly to the case shown in FIG. 8, represents the positions Q1 to Q10 on the center line of the upper surface of the negative pressure pad 50 shown in FIGS. 9A and 9B. On the other hand, the axis of the ordinate represents the level of the pressure (negative pressure) given to the magnetic sheet.

The pressure distribution on the negative pressure pad 50 becomes such as designated in FIG. 10 by pressure distribution curve $1_1$.

That is, the pressure is rapidly lowered in the portion between positions Q1 and Q2, causing the negative pressure to be raised. Since the depth is constant in the recessed groove between positions Q2 and Q3 and the portion between positions Q3 and Q4 of the cut portion 55, the negative pressure is gradually reduced and moderately allowed to approach the atmospheric pressure. In the portion between Q4 and Q7 in the vicinity of the magnetic head, a substantially constant negative pressure level is shown due to the action of the space formed in this portion. Therefore, a stable attracting force, that is, stable head touch can be obtained in both the upstream side and the downstream side of the magnetic head. In the projection portion from Q7 to Q8, the depth of the pad with respect to the magnetic sheet is again reduced, causing the pressure change to be made large, that is, the gradient is rapidly raised toward the atmospheric pressure. In the cut between Q8 and Q10, the pressure gradually approaches the atmospheric pressure.

As described above, the negative pressure pad shows a characteristic that the more the depth of the surface confronting the magnetic sheet with respect to the magnetic sheet becomes reduced, the more the gradient of the pressure change becomes steep.

Referring to FIG. 10, curve $1_2$ is a pressure distribution curve in the case when the cut portion 55 is not formed in the projection 53. As shown in the drawing, since the depth is reduced in the portion between positions Q3 and Q4 due to the presence of the upper surface of the projection 53, the negative pressure increases.

The pressure distribution becomes such as designated by pressure distribution characteristics curve $1_3$ shown in FIG. 10 in the case when the cut portion 55 is formed in the projection 53 of the negative pressure pad 50 at a position downstream of the magnetic head as an alternative to the position upstream of the head. That is, since the depth of the pad becomes constant in the portion between Q7 and Q10, the gradient of the pressure change becomes constant. Therefore, although a constant negative pressure is shown in the portion between Q4 and Q7, the overall negative pressure level is lowered and approximates the atmospheric pressure. Then, the pressure is rapidly changed in the portion between Q3 and Q4.

As is shown, in the structure in which the cut portion 55 is formed downstream in comparison to the position of the magnetic head, the cut portion 55 is formed in the direction in which air flows out with respect to the direction of rotation of the magnetic sheet. Therefore, the pressure level can easily approximate the atmospheric pressure. As designated by curve $1_3$, the negative pressure in the vicinity of the magnetic head is lowered, while the flowing out of air is not considerably changed in the negative pressure pad according to the present invention in comparison to the negative pressure pad in which the cut portion 55 is not formed, since the cut portion 55 is formed in the upstream direction. Therefore, the pressure distribution around the magnetic head is not considerably changed in comparison to the structure in which the cut portion 55 is not formed. As a result, a stable, high negative pressure can be obtained.

When the rotation of the magnetic sheet is stopped, the air pressure in the projection 53 is immediately made the same as the atmospheric pressure due to the presence of the cut portion 55. Therefore, sticking of the magnetic sheet to the negative pressure pad can be prevented and the two thereby can be readily separated from each other.

As described above, according to the recording or reproducing apparatus according to the present invention, the projection disposed on the upper surface of the negative pressure pad and arranged to generate the negative pressure has a cut in the upstream direction of the magnetic head. Therefore, when the magnetic sheet is stopped, the air pressure level in the projection is quickly restored to the atmospheric pressure via the above-described cut. Therefore, the magnetic sheet can quickly be separated from the negative pressure level. As a result, a problem that the magnetic sheet cannot be separated from the negative pressure pad after the rotation of the magnetic sheet has been stopped can be overcome. Furthermore, the negative pressure is not lowered during the rotation of the magnetic sheet. As a result, the magnetic sheet is able to satisfactorily contact the magnetic head. Therefore, excellent head touch can be realized since a stable, negative pressure can always be generated, similar to the negative pressure pad having no cut.

A fourth embodiment of the present invention now will be described. This embodiment relates to an improvement in a position aligning means arranged to act when the stabilizing member is fastened to the apparatus.

Usually, the pad is, by a bond or the like, integrally secured to the magnetic head while correctly positioning the magnetic head by inserting it into a head through-hole formed in the central portion of the pad. At this time, the relative position between the head and the head through-hole and the length of the projection (about several micromillimeters) of the head over the top surface of the pad must be precisely secured. Therefore, there has been employed a method in which the fastening position is correctly aligned while checking the interference fringe by using an interference microscope or the like.

However, the magnetic head and the clamp are fastened to each other while clamping them by a clamping mechanism provided for an aligning device at the time of the fastening operation of the head and the stabilizing member. Since a pad is usually in the form of a circular shape, the relative positional alignment between the head and the pad in the rotational direction cannot be easily performed. Therefore, an excessively long time is required to complete the work of aligning the head and the stabilizing member in the desired plane. In addition, the work cannot be easily performed, causing the accuracy and manufacturing yield to deteriorate.

Accordingly, an object of this embodiment lies in a recording or reproducing apparatus for recording or reproducing information by relatively moving a head and a sheet recording medium, the recording or reproducing apparatus comprising: a stabilizing member arranged to generate pressure which brings the recording medium into contact with the head by a relative movement of the recording medium and the head, wherein a portion for aligning the stabilizing member is formed in all positions except for the portion of the surface of the stabilizing member which confronts the recording medium.

As a result, there is provided a recording or reproducing apparatus capable of accurately aligning the pad without obstructing other members, or jigs, or without interrupting measuring by using an interference microscope or aligning by adjustment tools.

Figure 11:
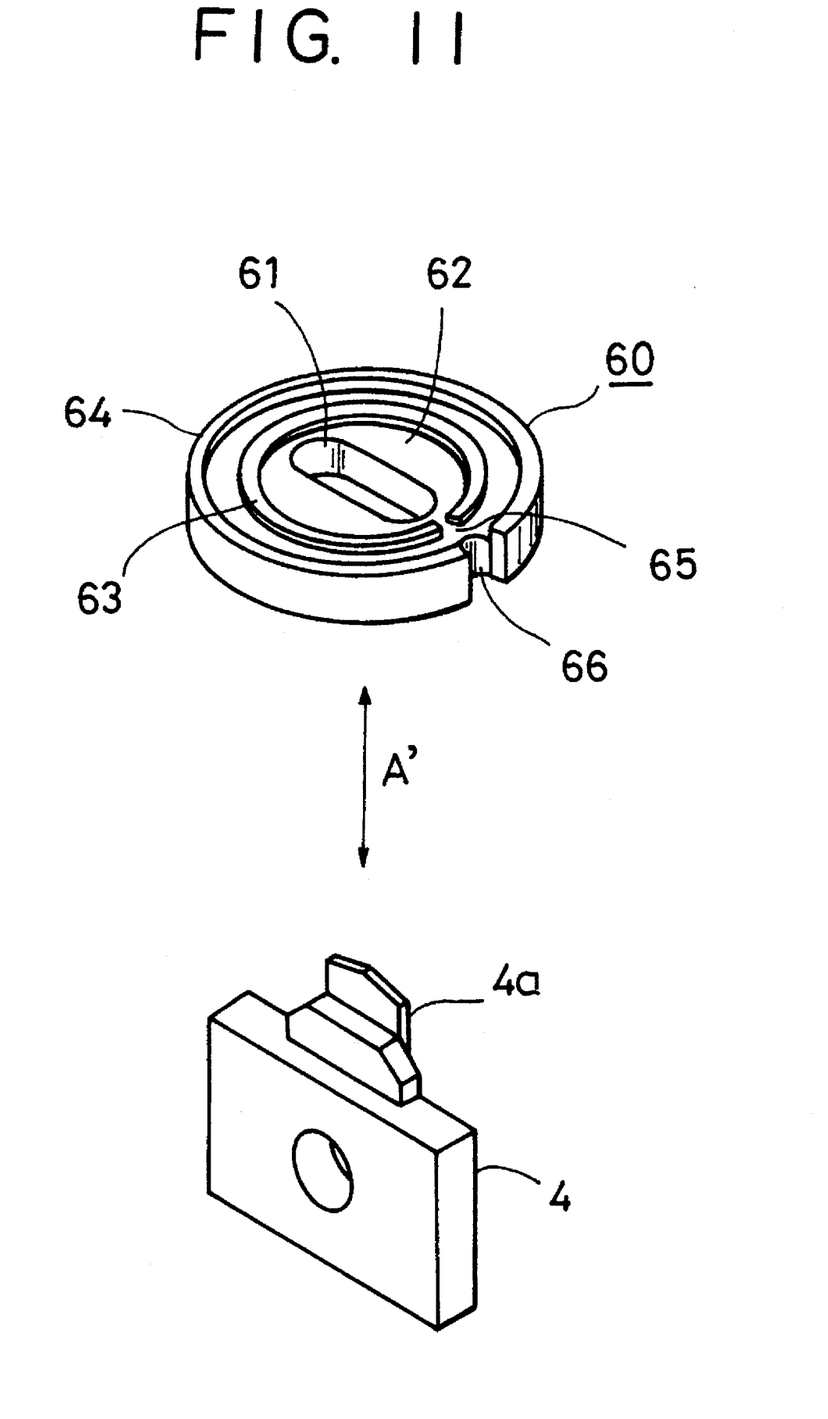
FIG. 11 is a perspective view which illustrates a fourth embodiment of a negative pressure pad employed in a recording or reproducing apparatus according to the present invention.

FIG. 11 is an enlarged perspective view which illustrates a pad according to this embodiment. A negative pressure pad 60 is disposed around the magnetic head and arranged to have the top surface thereof confronting the magnetic sheet and comprising a flat portion 62 which has an elongated hole 61, through which the magnetic head passes, at the central portion thereof. In its periphery, the pad has concentric projections 63 and 64 which respectively project over the flat portion 62 by substantially several tens of micromillimeters and which are disposed at a predetermined interval. Furthermore, a cut portion 65 is formed in the above-described projection in a portion in the downstream direction of the rotation of the magnetic sheet, the cut portion 65 acting to discharge air flow generated by the rotation of the magnetic sheet.

An aligning groove 66 is formed in the side surface of the pad 60 downstream in the rotational direction of the magnetic disk, the aligning groove 66 being arranged to be engaged to an aligning tool or the like (omitted from illustration) so that the pad is accurately positioned. The aligning groove 66 is arranged to be in the form of a cut and positioned as described above so that the head touch is not affected.

Figure 12:
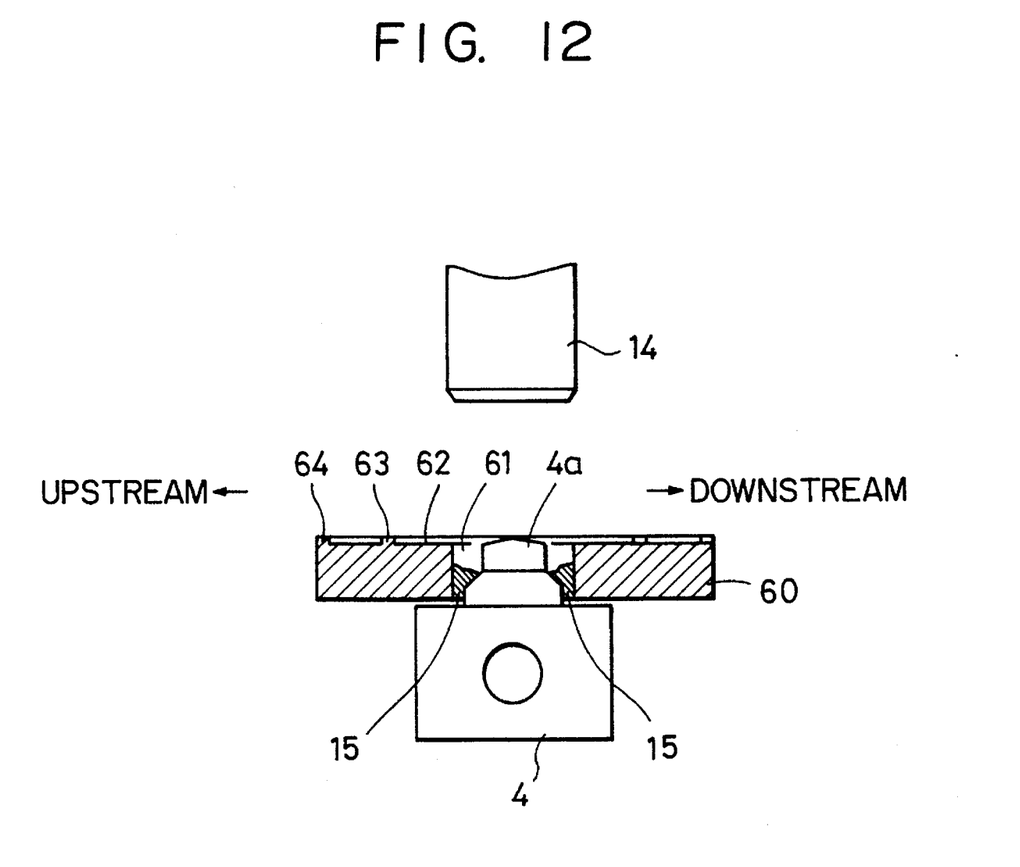
FIG. 12 illustrates an aligning operation of the negative pressure pad and the magnetic head.

It is difficult to form the aligning portion on the top surface of the negative pressure pad, because of the following reasons: since the degree (step) of projection of each of the projections is several tens of micromillimeters; since the magnetic head 4 is inserted into the elongated hole 61; and an extreme accuracy is required for the top surface. Furthermore, in the aligning operation, an aligning tool (for example, an interference objective lens 14 of an interference microscope as shown in FIG. 12) is positioned on the top surface. Therefore, the aligning work cannot be performed on the top surface.

When the pad 60 is fastened to the apparatus, as designated by double-head arrow A' shown in FIG. 11, the two are bonded as shown in FIG. 12 while inserting a chip portion 4a of the magnetic head 4 into the elongated hole 61 formed in the central portion of the negative pressure pad 60.

At this time, the aligning work is performed while checking the interference fringe by using an interference microscope or the like in such a manner that the chip portion 4a of the magnetic head 4 correctly runs parallel to the elongated hole 61 formed in the pad and so that the same projects over the surface of each of the projections 63 and 64 by several micromillimeters. Reference numeral 14 represents an interference objective lens of the interference microscope.

When the conventional pad having no aligning groove 66 is aligned, the pad 60 and the magnetic head 4 are clamped by a clamping mechanism for holding .the pad and provided for an aligning tool (omitted from illustration). However, since the pad is in the form of a circular shape, its position in the rotational direction cannot be accurately aligned. Therefore, it takes an excessively long time to complete the alignment of the elongated hole 61 parallel to the chip portion 4a of the magnetic head 4.

However, according to the pad of the present invention, the aligning groove 66 is formed so that alignment is possible with respect to an aligning tool or the like (omitted from illustration) without using the top surface of the pad and without obstructing the disposition of other tools and operations. Therefore, the time necessary to complete the aligning and adjusting of the pad can be significantly shortened. Furthermore, the accuracy in the aligning can be improved.

The operation of the thus fastened stabilizing member now will be described. When the magnetic sheet is rotated at high speed while positioning the top surface of the stabilizing member close to the magnetic sheet, air between the projections 63 and 64 confronting the magnetic sheet and that which is inside of the projection 63 is, due to the viscosity of air, allowed to flow out through the gap between the projections and the magnetic sheet and the cut portion 65 formed in the projection. Furthermore, substantially no air flows into the above-described space and the gap between the projection and the magnetic sheet. Therefore, negative pressure is generated in the space and the gap between the projection and the magnetic sheet. As a result, the magnetic sheet is attracted toward the stabilizing member by the thus generated negative pressure so that they are brought into close contact with each other.

Therefore, the magnetic head and the magnetic sheet can always be stably brought into contact with each other during the rotation of the magnetic sheet.

Since the pad according to the present invention is arranged in such a manner that the aligning groove 66 is formed in the side surface of the pad downstream in the direction of the rotation of the magnetic sheet so as not to interfere with the air flow generated by the rotation of the magnetic sheet, a stable, attractive effect of the magnetic sheet can be obtained while maintaining the performance of the negative pressure pad.

Figure 13:
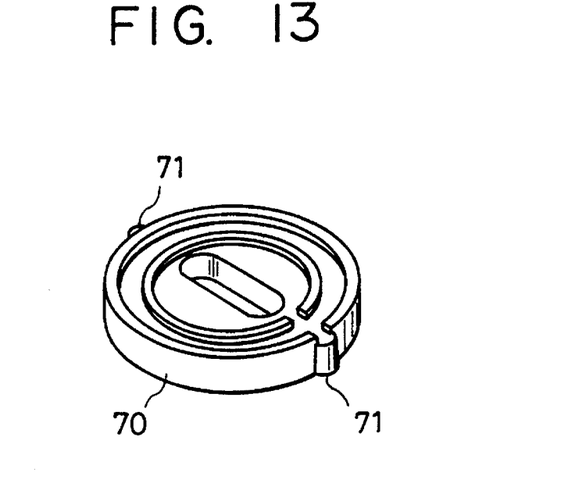
FIG. 13 is a perspective view which illustrates a fifth embodiment of the negative pressure pad according to the present invention.
Figure 14:
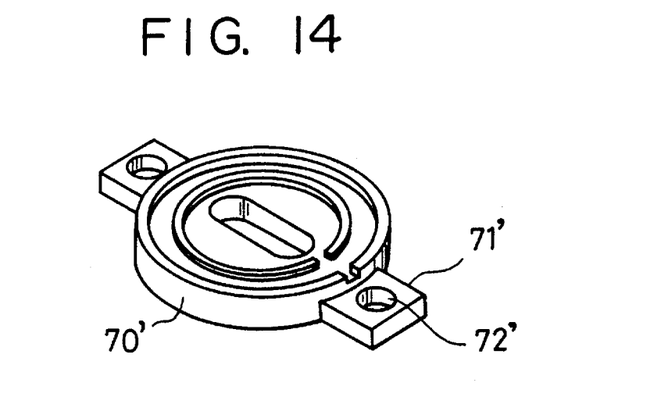
FIG. 14 is a perspective view which illustrates a sixth embodiment of the negative pressure pad according to the present invention.
Figure 15:
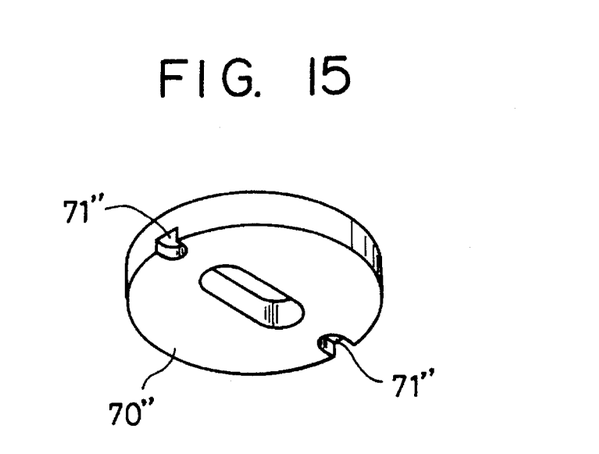
FIG. 15 is a perspective view which illustrates a seventh embodiment of the negative pressure pad according to the present invention.

FIGS. 13 to 15 respectively illustrate another embodiment of the negative pressure pad. FIG. 13 illustrates a structure arranged in such a manner that two aligning projections 71 are respectively disposed in the negative pressure pad 70 upstream and downstream of the rotational direction of the magnetic sheet while preventing projection over the top surface of the pad, in particular, the upper annular projection. Similar to the first embodiment, a similar effect can be obtained while maintaining the performance of the negative pressure pad.

FIG. 14 illustrates a structure arranged in such a manner that two aligning projections 71' are respectively disposed in the negative pressure pad 70' upstream and downstream of the rotational direction of the magnetic sheet while preventing projection over the top surface of the pad, in particular, the upper annular projection. Furthermore, according to this structure, aligning or screw-fastening holes 72' are formed in the aligning projections 71', the holes 72' also serving as fastening members of the pad 70'. Also, according to this embodiment, a similar effect to that obtainable from the first and second embodiments can be obtained while maintaining the performance of the negative pressure pad.

FIG. 15 illustrates a structure arranged in such a manner that two cuts 71" are formed in the lower side of the negative pressure pad 70" upstream and downstream of the rotational direction of the magnetic sheet without penetrating the top surface of the pad 70".

According to the embodiments shown in FIGS. 13 through 15, two aligning members are formed on the center line of the elongated hole through which the magnetic head passes. However, the present invention is not limited to the above-noted description. Therefore, a variety of modifications can be employed if the same does not project over the top surface of the pad.

As described above, the recording or reproducing apparatus according to the present invention is arranged in such a manner that the aligning member is formed such that it does not project over the projection formed on the top surface, preferably disposed in the downstream direction in terms of preventing adverse influence, the aligning member being disposed in portions thereof except for the top surface of the negative pressure pad 1 or in the top surface of the same. Therefore, the accuracy in aligning can be improved, as well as the workability can be improved, causing the time necessary to complete the alignment operation to be shortened.

An eighth embodiment of the present invention will be described. This embodiment relates to an improvement in a method of securing the pad to the recording or reproducing apparatus.

Figure 17A:
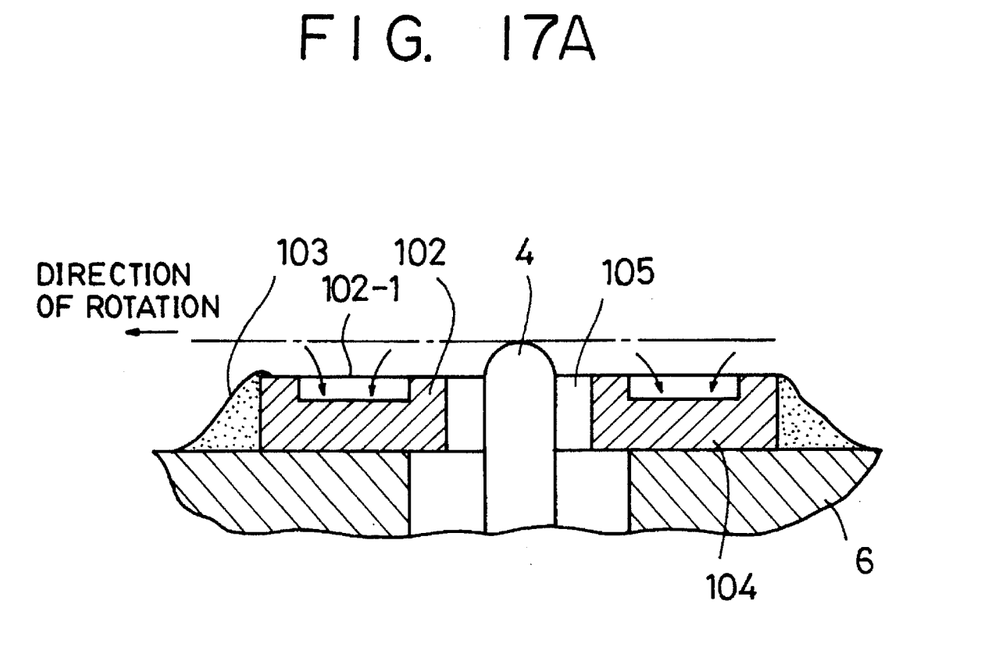
FIGS. 17A and 17B are cross-sectional views which respectively illustrate a ninth embodiment of the shape of the negative pressure pad according to the present invention.
Figure 17B:
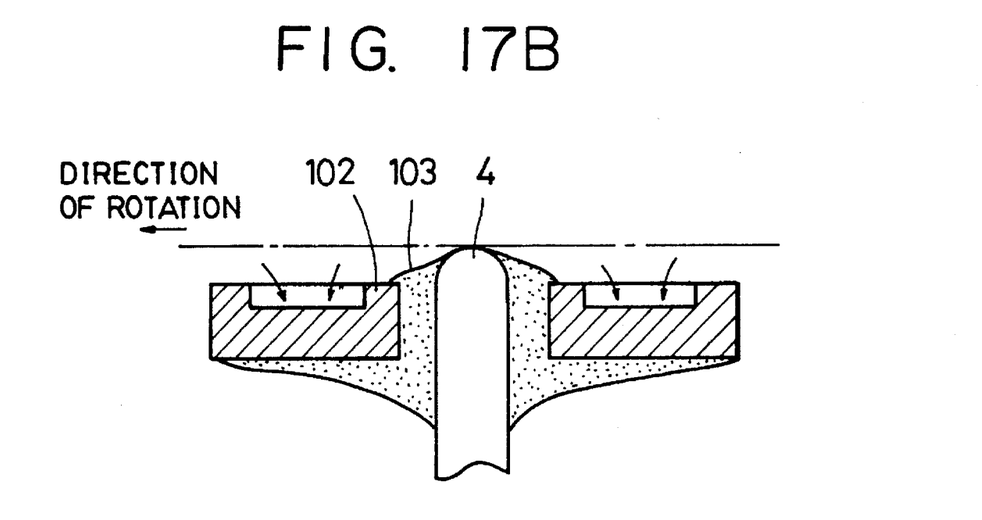

As a method of securing the negative pressure pad, a method has been to arrange, in such a manner that the side peripheral portion of the head carriage 6 to which the magnetic head 4 is, as shown in FIG. 17A, fastened and the negative pressure pad 102 are bonded. Another method is known in which the magnetic head 4 and the bottom surface of the negative pressure pad 102 and the head through-hole 105 are, as shown in FIG. 17B, bonded. However, either of the above-described methods have a problem in that an adhesive agent 103 can undesirably flow to the top surface of the negative pressure pad 102 or the front end of the magnetic head 4 when the negative pressure pad is bonded.

If the adhesive agent 103 reaches the top surface 102-1 of the negative pressure pad 102 which confronts the magnetic sheet as shown in FIG. 17A, the adhesive agent 103 projects in the form of burrs on the top surface of the negative pressure pad 102. As a result, the recording surface of the magnetic sheet is damaged and recording or reproducing thereby cannot be performed.

In the case when the adhesive agent 103 reaches the front end portion of the magnetic head 4 as shown in FIG. 17B, the contact surface of the magnetic head 101 is undesirably covered or the magnetic sheet will be damaged. As a result, recording or reproducing cannot be performed.

An object of this embodiment is to overcome the above-described problems. This embodiment is characterized by a recording or reproducing apparatus for recording or reproducing information by relatively moving a recording medium and a head, the recording or reproducing apparatus comprising: a pad disposed in a fastening portion near the head and arranged to generate negative pressure which attracts the recording medium to the head in accordance with the movement of the recording medium, wherein the pad has a recessed portion or a projection portion or the like in the vicinity of the fastening portion which confronts the recording medium.

As a result, the adhesive agent can be precisely accumulated in the adhesive portion of the pad. Therefore, overflow of the adhesive agent to the surface of the pad confronting the magnetic sheet and to the front portion of the magnetic head can be prevented.

The recording or reproducing apparatus according to this embodiment now will be described with reference to this embodiment.

Figure 16A:
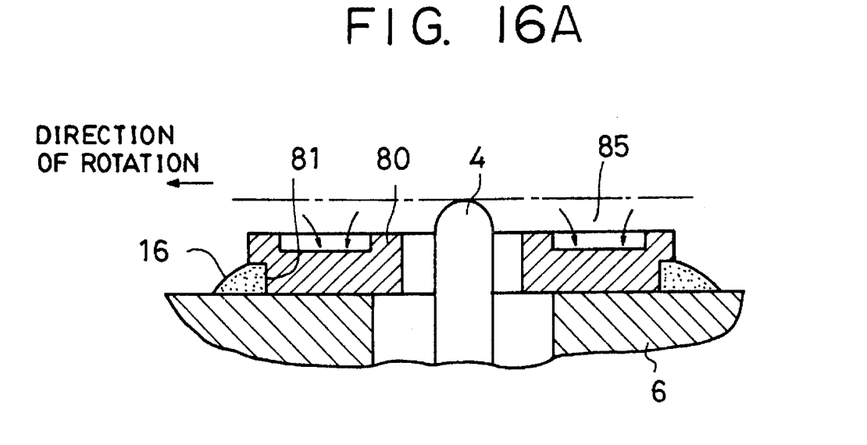
FIGS. 16A, 16B and 16C are cross-sectional views which respectively illustrate an eighth embodiment of the shape of the negative pressure pad according to the present invention.
Figure 16B:
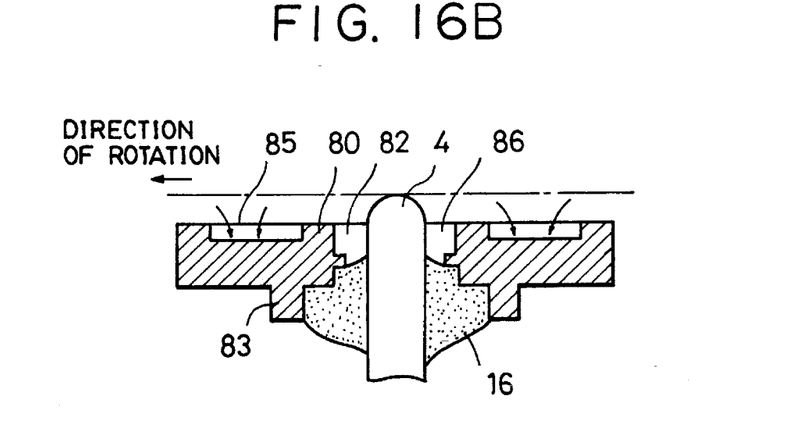
Figure 16C:
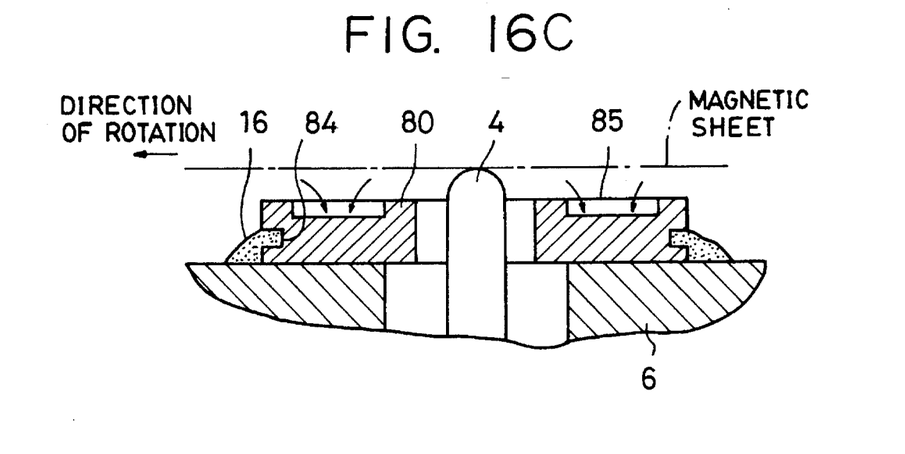

FIG. 16A illustrates the structure of the negative pressure pad according to the present invention. FIGS. 16B and 16C respectively illustrate other embodiments of the negative pressure head according to the present invention. Referring to the drawings, reference numerals 81 to 84 represent projections and recesses for preventing the overflow of the adhesive agent 16 to the top surface of the negative pressure pad 85 and the front portion of the magnetic head 4. As a result of the provisions of the above-described recessed portions, any overflowing adhesive can be accumulated in the adhesion operation, causing any overflow of the same to the pad and the top surface of the head to be prevented. Reference numerals 81 and 83 represent recessed portions formed around or in a portion of the side portion of the outer surface of the negative pressure pad 80. Reference numeral 82 represents a projection formed around or in a portion of a hole 86 in the negative pressure pad 80 through which the magnetic head projects. Reference numeral 83 represents projections formed around or in a portion of the bottom surface of the negative pressure pad 80 at a position near the projection 87 of the magnetic head. The above-described projections and recessed portions may, of course, be varied in the positions and manner in accordance with the position at which the adhesive agent is applied.

When the negative pressure pad 80 and the carriage 6 or the same and the magnetic head 4 are adhered to each other, the adhesive agent 16 can be accumulated and stopped by the above-described projections and recessed portions 81 to 84. Therefore, it cannot adhere to the top surface 85 of the negative pressure pad and the front portion of the magnetic head 4. As a result, the recording surface of the magnetic sheet can be protected from the adhesive agent 16 or the contact surface of the magnetic head 4 cannot be covered with the adhesive agent 16. Therefore, recording or reproducing from the magnetic sheet 3 can always be reliably performed.

As described above, the recording or reproducing apparatus according to the present invention has a recessed portion or a projection capable of serving as an accumulating portion of the adhesive agent on the outer side surface, the bottom surface, or the through-hole through which the magnetic head projects. Therefore, the top surface of the negative pressure pad and the front portion of the magnetic head can be protected from the adhesive agent. As a result, defective recording or reproducing from the magnetic sheet can be prevented. Consequently, the stability and the reliability of the apparatus can be improved.

Although the invention has been described in its preferred form with a certain degree of particularity, it is understood that the present disclosure of the preferred form can be changed in the details of construction and the combination and arrangement of parts may be resorted to without departing from the spirit and the scope of the invention as hereinafter claimed.

What is claimed is:

1. A recording or reproducing apparatus for recording or reproducing information by relatively moving a head and a sheet recording medium, said recording or reproducing apparatus comprising:

a stabilizing member disposed around said head and arranged to generate pressure to cause said recording medium to contact said head during rotation of said recording medium, wherein said stabilizing member comprises:

an inner portion and an outer portion corresponding to an inner and outer portion of the sheet recording medium, a first projection portion having a projection surface projecting toward said recording medium, a groove portion provided adjacent said first projection portion, a second projection portion spaced from said first projection portion via a groove portion, said second projection portion having a projection surface projecting toward said recording medium, and a cut portion formed in a portion of said second projection portion downstream from said head in a direction of rotation of said recording medium, said cut portion being formed by cutting said second projection portion from a surface of which confronts said recording medium, and the depth of said groove portion with respect to said recording medium being reduced from the outer portion of said stabilizing member to the inner portion thereof.

2. A recording or reproducing apparatus according to claim 1, wherein the bottom surface of said groove portion slants from the inner portion of said recording medium toward the outer portion thereof.

3. A recording or reproducing apparatus according to claim 1, wherein said stabilizing member further comprises a circular negative pressure generating member disposed around said head.

4. A recording or reproducing apparatus according to claim 3, wherein said first and second projection portions are concentrically arranged around said head.

* * * * *